(12) United States Patent
Nakura et al.

(10) Patent No.: US 12,119,876 B2
(45) Date of Patent: Oct. 15, 2024

(54) NETWORK CONTROL DEVICE, COMMUNICATION RESOURCE ALLOCATION METHOD, AND COMMUNICATION SYSTEM

(71) Applicant: Mitsubishi Electric Corporation, Tokyo (JP)

(72) Inventors: Kenichi Nakura, Tokyo (JP); Takeshi Suehiro, Tokyo (JP); Akiko Iwasaki, Tokyo (JP); Jun Mizuguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 264 days.

(21) Appl. No.: 17/568,970

(22) Filed: Jan. 5, 2022

(65) Prior Publication Data
US 2022/0131610 A1 Apr. 28, 2022

Related U.S. Application Data

(63) Continuation of application No. PCT/JP2019/036578, filed on Sep. 18, 2019.

(51) Int. Cl.
*H04B 10/27* (2013.01)
*H04B 10/272* (2013.01)
*H04Q 11/00* (2006.01)

(52) U.S. Cl.
CPC .......... *H04B 10/27* (2013.01); *H04B 10/272* (2013.01); *H04Q 11/0062* (2013.01); *H04Q 2011/0064* (2013.01); *H04Q 11/0067* (2013.01)

(58) Field of Classification Search
CPC ... H04B 10/27; H04B 10/272; H04L 41/5019; H04L 43/0876; H04L 41/0896;
(Continued)

(56) References Cited

U.S. PATENT DOCUMENTS 11,290,889 B2 * 3/2022 Zhao ................ H04L 41/5051
11,575,439 B1 * 2/2023 Yigit .................... G06F 16/22
(Continued)

FOREIGN PATENT DOCUMENTS

| JP | 2006-41735 A | 2/2006 |
|----|---|---|
| JP | 5465315 B1 | 4/2014 |
| JP | 2016-116184 A | 6/2016 |

OTHER PUBLICATIONS

Chinese Office Action and Search Report for corresponding Chinese Application No. 201980100161.9, dated Dec. 9, 2023, with English translation.
(Continued)

*Primary Examiner* — Dibson J Sanchez
(74) *Attorney, Agent, or Firm* — Birch, Stewart, Kolasch & Birch, LLP

(57) ABSTRACT

A network control device for generating a slice by dividing a network and allocating communication resources to the slice, the slice being a virtual network, the network control device including: a processor; and a memory to store a program which, when executed by the processor, performs processes of: obtaining and holding resource information from a network device included in the network, the resource information including information on a maximum usage rate of communication resources allocated to a previously generated slice in at least one predetermined period; and determining, upon receiving a request for generating a new slice, whether or not the requested slice can be generated on the basis of the resource information held, wherein the resource information includes information on a maximum usage rate of communication resources, which are allocated to the previously generated slice, depending on a request delay concerning the slice in the predetermined period.

19 Claims, 11 Drawing Sheets

(58) Field of Classification Search
CPC ............... H04L 41/0895; H04L 12/44; H04Q 2011/0064; H04Q 11/0067; H04Q 11/0062
USPC .................................................. 398/43–103
See application file for complete search history.

(56) References Cited

U.S. PATENT DOCUMENTS

| | | | | |
|---|---|---|---|---|
| 2002/0006111 A1* | 1/2002 | Akita | ................... | H04B 10/272 370/477 |
| 2003/0043741 A1* | 3/2003 | Mukai | ................... | H04L 47/10 370/468 |
| 2008/0226293 A1* | 9/2008 | Ogushi | ................... | H04L 12/40 398/59 |
| 2010/0239255 A1* | 9/2010 | Ikeda | ................... | H04J 3/1694 398/66 |
| 2011/0305451 A1* | 12/2011 | Nishitani | ............... | H04L 47/822 398/25 |
| 2014/0317293 A1* | 10/2014 | Shatzkamer | ........ | H04L 41/5054 709/226 |
| 2017/0208019 A1* | 7/2017 | Shimojou | ............... | H04L 47/82 |
| 2018/0123878 A1* | 5/2018 | Li | ........................... | H04L 41/40 |
| 2019/0037409 A1* | 1/2019 | Wang | ..................... | H04W 8/08 |
| 2019/0123963 A1* | 4/2019 | Tang | ...................... | H04L 45/64 |
| 2020/0015293 A1* | 1/2020 | Wang | .................. | H04L 41/0893 |
| 2020/0267623 A1* | 8/2020 | Altay | ..................... | H04L 45/64 |
| 2021/0067421 A1* | 3/2021 | Kidd | ..................... | H04L 49/101 |
| 2021/0076220 A1* | 3/2021 | Hirano | .................. | H04W 24/02 |
| 2021/0120321 A1* | 4/2021 | Ruffini | .................. | H04Q 11/00 |
| 2021/0153113 A1* | 5/2021 | Nakura | ................. | H04W 28/16 |
| 2021/0159984 A1* | 5/2021 | Lee | ....................... | H04B 10/27 |
| 2022/0014434 A1* | 1/2022 | Shi | ...................... | H04L 41/5019 |

OTHER PUBLICATIONS

Notice of Reasons for Refusal for Japanese Application No. 2020-513360, dated May 19, 2020.
Saito et al., "New Architecture to Flexibly and Dynamically Control MFH/MBH for IoT services", IEICE Technical Report, Aug. 30, 2018, vol. 118, No. 208, p. 53-58, total 7 pages.

* cited by examiner

FIG.3

| PATH | DELAY | BAND USAGE RATE |
|---|---|---|
| ONU2-1→L2SW3-1 | 1ms | 50% |
| | 4ms | 50% |
| ... | ... | ... |

| PATH | DELAY | BAND USAGE RATE |
|---|---|---|
| ONU2-1→L2SW3-1 | 1ms | 75% |
|  | 4ms | 31.25% |
| ... | ... | ... |

FIG.11

| PATH | DELAY | PRIORITY | BAND USAGE RATE |
|---|---|---|---|
| ONU2-1→L2SW3-1 | 1ms | HIGH | 25% |
| | | LOW | 50% |
| | 4ms | HIGH | 10% |
| | | LOW | 5% |
| ... | ... | ... | ... |

FIG.12

| PATH | DELAY | PRIORITY | BAND USAGE RATE |
|---|---|---|---|
| ONU2-1→L2SW3-1 | 1ms | 1(LOW PRIORITY) | 30% |
| | | 3 | 20% |
| | | 5 | 15% |
| | | 7(HIGH PRIORITY) | 10% |
| | 4ms | 1(LOW PRIORITY) | 10% |
| | | 3 | 10% |
| | | 5 | 3% |
| | | 7(HIGH PRIORITY) | 2% |
| ... | ... | ... | ... |

FIG.13

| PATH | DELAY | SLICE ID | BAND USAGE RATE |
|---|---|---|---|
| ONU2-1→L2SW3-1 | 1ms | SLICE #1 | 30% |
| | | SLICE #2 | 20% |
| | | SLICE #3 | 15% |
| | | SLICE #4 | 10% |
| | 4ms | SLICE #1 | 10% |
| | | SLICE #2 | 10% |
| | | SLICE #3 | 3% |
| | | SLICE #4 | 2% |
| ... | ... | ... | ... |

NETWORK CONTROL DEVICE, COMMUNICATION RESOURCE ALLOCATION METHOD, AND COMMUNICATION SYSTEM

CROSS-REFERENCE TO RELATED APPLICATION

This application is a continuation application of International Application PCT/JP2019/036578, filed on Sep. 18, 2019, and designating the U.S., the entire contents of which are incorporated herein by reference.

BACKGROUND OF THE INVENTION

1. Field of the Invention

The present disclosure relates to a network control device, a communication resource allocation method, and a communication system.

2. Description of the Related Art

Various forms of communication services have been increasingly provided. Accordingly, studies are ongoing on technologies for containing various communication services in one communication network and providing a plurality of services with different request conditions, such as mobile broadband services that require high data rates, mission-critical services that require high reliability and low delay, and sensor information gathering services that require high-density accommodation of devices. Specifically, studies are ongoing on technologies for allocating communication services to each of a plurality of virtual networks obtained by logically dividing a communication network, and performing transmission and reception of data by using the allocated virtual network in each of the communication services. Note that virtual networks obtained by logically dividing a communication network are also called slices, and the term slice will be used in the following description.

Slices are managed by a controller that controls devices constituting a communication network. The controller that manages the slices reserves, for each device, communication resources necessary for the communication service allocated to each slice from among communication resources that can be used by the devices constituting the communication network, and allocates the communication resources to each slice.

In order to allocate communication resources necessary for providing a requested communication service to a slice, a technology for accurately and efficiently gathering and managing information on communication resources held by devices has been studied (refer to Patent Literature 1, for example).

In a disclosure described in Patent Literature 1, a network monitoring device for monitoring a physical network holds, in a form of a table, information on communication resources held by devices included in the physical network and information on connections between the devices. The network monitoring device refers to the table and provides necessary information to an operator in response to a request for allocation of a slice, and updates the information on the communication resources held by the devices present on a communication path on which a slice is generated and the information on the connections between the devices in accordance with a result of operation performed by the operator to set the slice.

CITATION LIST

Patent Literature

Patent Literature 1: Japanese Patent Application Laid-open No. 2016-116184

In the disclosure described in Patent Literature 1, when a new slice allocation request is received, the network monitoring device refers to the information on the communication resources allocated to the devices included in the physical network to perform determination on communication resources that are available. The network monitoring device described in Patent Literature 1, however, cannot obtain an actual amount of communication resources used in an allocated slice. This may cause such problems as allocating communication resources that cannot meet the performance required of a service to which a slice is allocated or allocating excessive communication resources, which lowers the efficiency of use of the whole network.

SUMMARY OF THE INVENTION

To solve the above problem and achieve an object, the present disclosure is directed to a network control device for generating a slice by dividing a network and allocating communication resources to the slice, the slice being a virtual network, the network control device includes: a processor; and a memory to store a program which, when executed by the processor, performs processes of: obtaining and holding resource information from a network device included in the network, the resource information including information on a maximum usage rate of communication resources allocated to a previously generated slice in at least one predetermined period. Furthermore, the network control device includes determining, upon receiving a request for generating a new slice, whether or not the requested slice can be generated on the basis of the resource information held. The resource information includes information on a maximum usage rate of communication resources, which are allocated to the previously generated slice, depending on a request delay concerning the slice in the predetermined period.

BRIEF DESCRIPTION OF THE DRAWINGS

FIG. 3 is a table illustrating an example of resource information held by a resource managing unit of the controller according to the first embodiment.

FIG. 11 is a table illustrating an example of resource information generated by a resource information generating unit of an OLT according to a second embodiment.

FIG. 12 is a table illustrating a first example of resource information generated by a resource information generating unit of an OLT according to a third embodiment.

FIG. 13 is a table illustrating a second example of resource information generated by the resource information generating unit of the OLT according to the third embodiment.

DETAILED DESCRIPTION OF THE PREFERRED EMBODIMENTS

A network control device, a communication resource allocation method, and a communication system according to certain embodiments of the present disclosure will be described in detail below with reference to the drawings.

First Embodiment

Figure 1:
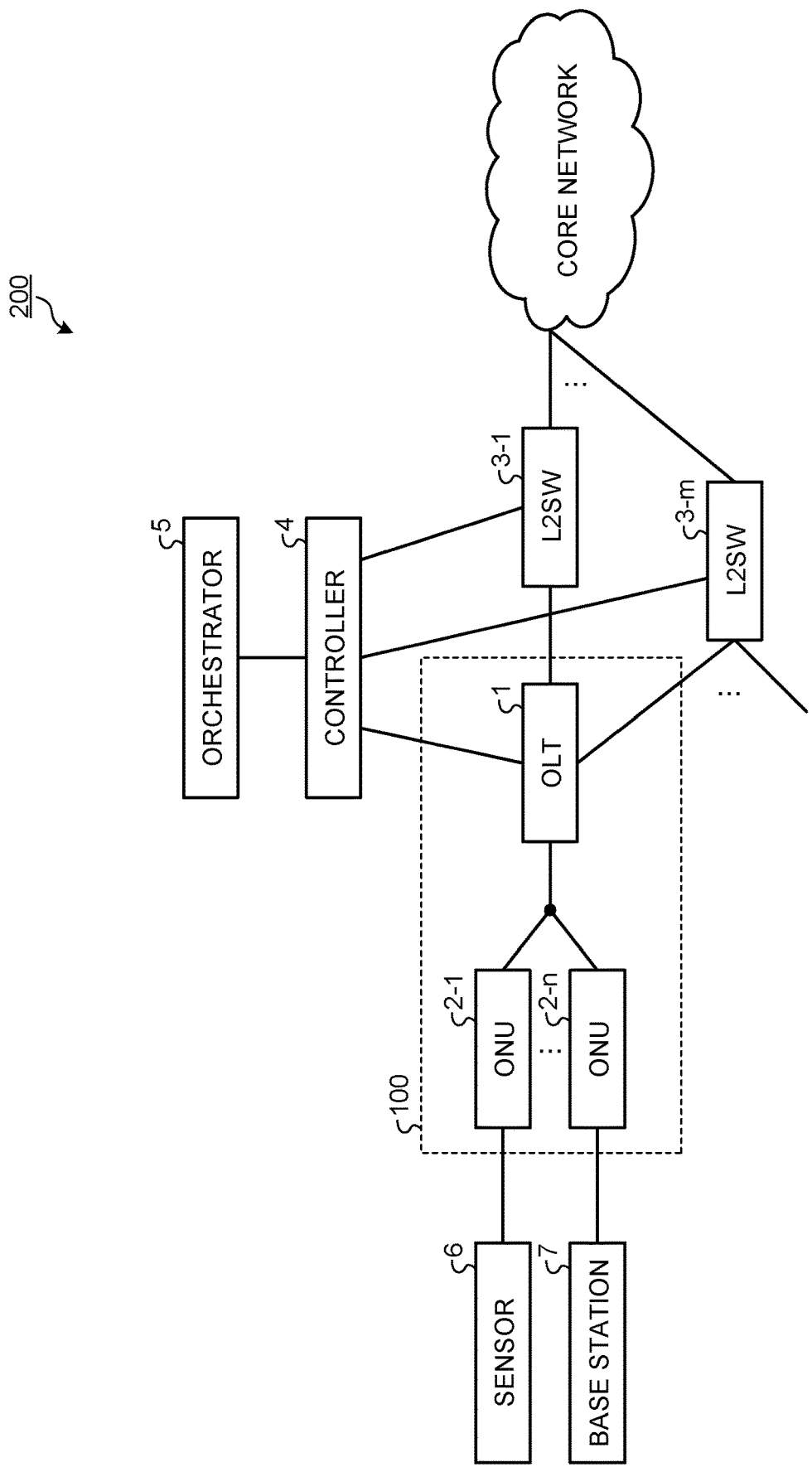
FIG. 1 is a diagram illustrating an example of a communication system according to a first embodiment of the present disclosure.

FIG. 1 is a diagram illustrating an example of a communication system according to a first embodiment of the present disclosure. A communication system 200 according to the present embodiment includes passive optical network (PON) systems 100, which are passive optical network systems, layer 2 switches (L2SW) 3-1 to 3-m, a controller 4, which is a network control device, and an orchestrator 5. Note that, although the communication system 200 includes a plurality of PON systems 100, only one PON system 100 is illustrated in FIG. 1. In the following description, the layer 2 switches 3-1 to 3-m will be collectively referred to as layer 2 switches 3 when the layer 2 switches 3-1 to 3-m need not be distinguished from each other such as in explanation of common features thereof.

The PON system 100 is constituted by an optical line terminal (OLT) 1, which is a master station device, and optical network units (ONUS) 2-1 to 2-n, which are slave station devices. In the following description, the ONUS 2-1 to 2-n will be collectively referred to as ONUS 2 when the ONUS 2-1 to 2-n need not be distinguished from each other such as in explanation of common features thereof.

The OLT 1 is connected with the ONUS 2-1 to 2-n via optical fibers. In the example illustrated in FIG. 1, one optical fiber connected to the OLT 1 branches at a passive element and connected to the ONUS 2-1 to 2-n. In addition, the OLT 1 is connected to the layer 2 switches 3-1 to 3-m and the controller 4. The numbers of ONUS 2 and layer 2 switches 3 connected with the OLT 1 are not limited to those illustrated in FIG. 1. The number of ONUS 2 connected with the OLT 1 may be one. The number of layer 2 switches 3 connected with the OLT 1 may be one.

A sensor 6 is connected with the ONU 2-1, and a base station 7 is connected with the ONU 2-n. The base station 7 is a base station of a mobile communication system, for example. Note that the sensor 6 and the base station 7 are examples of devices connected with the ONUS 2, and the devices connected with the ONUS 2 are not limited thereto. In addition, while an example of a configuration in which the sensor 6 is directly connected with the ONU 2-1 is presented in FIG. 1, a configuration in which an access point in a wireless local area network (LAN) is connected with the ONU 2-1 and the sensor 6 is connected with the access point may be used, for example. A plurality of sensors 6 may be connected with the ONU 2-1. Similarly, a plurality of base stations 7 may be connected with the ONU 2-n. In addition, a plurality of kinds of devices may be connected with each of the ONUS 2.

The layer 2 switches 3 are connected with the plurality of OLTs 1, aggregates communication traffic from each of the OLTs 1, and transfers the communication traffic to a core network. In addition, the layer 2 switches 3 each identify the destination of the communication traffic from the core network, and transfer the communication traffic to the OLT 1 that includes the ONU 2 to which the device that is the destination is connected.

The controller 4 is connected with the OLT 1 and each of the layer 2 switches 3, and controls the OLT 1 and the ONUS 2 constituting the PON system 100, and the layer 2 switches 3. While the controller 4 is not directly connected with the ONUS 2 and is assumed to control the individual ONUS 2 via the OLT 1 in the present embodiment, the controller 4 may be directly connected with each of the ONUS 2 and directly control the ONUS 2. Alternatively, the controller 4 may control the OLT 1 and the ONUs 2 via the layer 2 switches 3. In this case, the layer 2 switches 3 performs a process of superimposing communication traffic for control from the controller 4 on user data traffic and transferring resulting traffic to the OLT 1, and a process of separating the communication traffic for control coming from the OLT 1 from the user data traffic and transferring the separated communication traffic to the controller 4.

The controller 4 collects information relating to usage of communication resources from devices to be controlled, that is, communication devices constituting the communication system 200, or more specifically, the OLT 1, the ONUs 2, and the layer 2 switches 3. In addition, upon receiving a request for generating a slice from the orchestrator 5, the controller 4 determines whether or not a slice that meets the request can be generated on the basis of the usage of communication resources, and if the slice can be generated, generates the slice and allocates communication resources to the slice. The allocation of communication resources used herein refers to a process of reserving communication resources to be used for communication using the generated slice. The reserved communication resources are allocated to the individual ONUs 2 by the OLT 1, and used for transmission of user data by the ONUs 2. Note that, in the description below, the communication devices constituting the communication system 200 may be referred to as network devices. In addition, in the description below, terms "communication resource" and "band" are used for convenience, which mean the same.

The orchestrator 5 requests the controller 4 to generate a new slice necessary for providing services in accordance with an instruction from an external application or a service user. For convenience of explanation, a request for generation of a new slice from the orchestrator 5 will be referred to as a "communication resource request" in the description below.

Note that a physical network that connects the controller 4 with the individual network devices may be a dedicated network for transmitting the communication traffic for control or may be a shared network for also transmitting user data. Alternatively, each of the network devices constituting the communication system 200 is not limited to the OLT 1, the ONU 2, or the layer 2 switch 3 illustrated in FIG. 1, and a router may be used.

Figure 2:
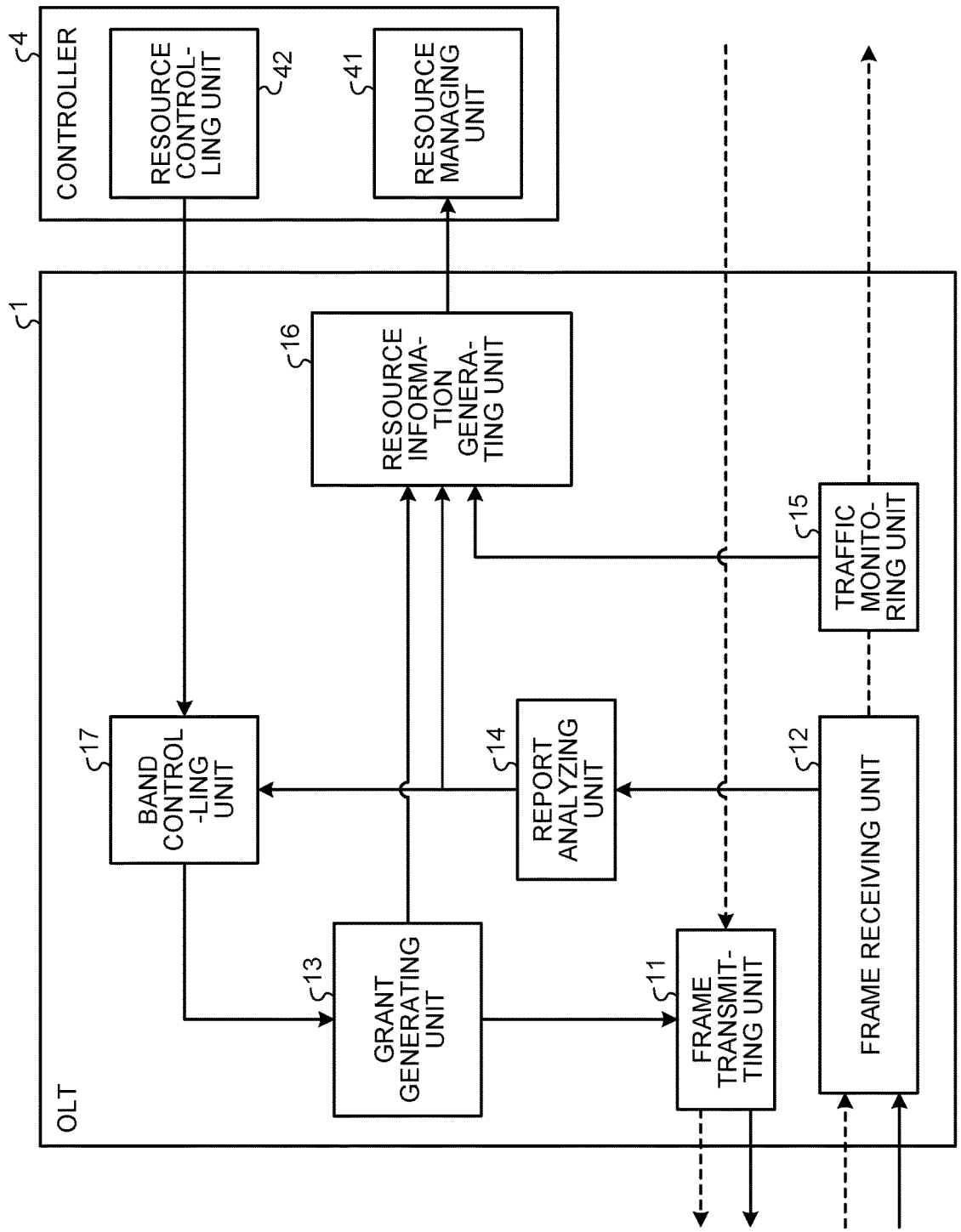
FIG. 2 is a diagram illustrating an example of functional block configurations of an OLT and a controller according to the first embodiment.

FIG. 2 is a diagram illustrating an example of functional block configurations of the OLT 1 and the controller 4 according to the first embodiment.

As illustrated in FIG. 2, the OLT 1 includes a frame transmitting unit 11, a frame receiving unit 12, a GRANT generating unit 13, a REPORT analyzing unit 14, a traffic monitoring unit 15, a resource information generating unit 16, and a band controlling unit 17. The controller 4 includes a resource managing unit 41, and a resource controlling unit 42. Note that, in FIG. 2, dashed arrows indicate the flows of user data, and solid arrows indicate the flows of control data, which are data used for control. In addition, although not illustrated in FIG. 2, the layer 2 switches 3, in addition to the OLT 1, are connected with the controller 4 as illustrated in FIG. 1. Furthermore, in a case where the communication system 200 has a configuration including a plurality of PON systems 100, a plurality of OLTs 1 are connected with the controller 4.

In the OLT 1, the frame transmitting unit 11 has functions of aggregating user data in a downlink direction input from the core network and control data of the PON system 100 input from the GRANT generating unit 13, and transferring the aggregated data to an ONU 2 that is the destination.

The frame receiving unit 12 has functions of separating user data in an uplink direction input from an ONU 2 from the control data of the PON system 100, transferring the user data to the core network, and transferring the control data to the REPORT analyzing unit 14.

The GRANT generating unit 13 has functions of calculating timing at which transmission permission is to be granted to an ONU 2 and a length of the time for which transmission is to be permitted, and outputting the calculated timing and length as control data of the PON system 100 to the frame transmitting unit 11.

The REPORT analyzing unit 14 has functions of analyzing control data received from the ONUs 2 by the frame receiving unit 12, obtaining information on the amount of data held for transmission to the OLT 1 by each of the ONUs 2, and calculating a necessary amount of band for data transmission for each of the ONUs 2.

The traffic monitoring unit 15 has a function of observing the number of frames, the number of bytes, and the like of user data transferred to the core network.

The resource information generating unit 16 has a function of calculating a band usage rate for each request delay in various communication services on the basis of part or all of information input from the GRANT generating unit 13, the REPORT analyzing unit 14 and the traffic monitoring unit 15. A request delay refers to a maximum delay time permitted in transmission of user data in a communication service. For example, in a case of a communication service with a request delay of 1 ms, the network devices realizing a slice used for the communication service perform processes of relaying user data so that the transmission delay time of the user data becomes no longer than 1 ms. The resource information generating unit 16 transmits the calculated band usage rate, as resource information, to the resource managing unit 41 of the controller 4.

The band controlling unit 17 determines how communication resources allocated by the resource controlling unit 42 of the controller 4 are to be used by the individual ONUs 2 on the basis of the necessary amount of band for data transmission for each of the ONUs 2 calculated by the REPORT analyzing unit 14, and informs the GRANT generating unit 13 of the determination result.

In the controller 4, the resource managing unit 41 receives and holds resource information input from the resource information generating unit 16 of the OLT 1.

Upon receiving a request for generating a new slice, that is, a communication resource request from the orchestrator 5, the resource controlling unit 42 performs a process of determining whether or not a slice meeting the request can be generated on the basis of the resource information held by the resource managing unit 41, and a process of determining communication resources to be allocated to the slice if the slice can be generated.

FIG. 3 is a table illustrating an example of resource information held by the resource managing unit 41 of the controller 4 according to the first embodiment. The resource information held by the resource managing unit 41 includes path information indicating a path that is a communication path used in a communication service, delay information indicating a request delay of the communication service to which a slice is allocated, and band usage rate information indicating the usage rate of a band allocated to the communication service.

In the present embodiment, it is assumed that the individual network devices are capable of controlling the transmission delay amount of user data. In FIG. 3, an example of resource information in a case where a band of 50% is used for communication with a transmission delay amount of 1 ms and a band of 50% is also used for communication with a transmission delay amount of 4 ms. The resource information may include a data rate expressed in bits per second instead of the band usage rate. In addition, the resource information may include an available band amount instead of the band usage rate. Note that, while only the band usage rate for each request delay on a path from the ONU 2-1 to the layer 2 switch 3-1 is described as the resource information for simplicity of explanation in FIG. 3, the resource information actually includes the band usage rate for each request delay on each of all the paths in the communication system 200 including other paths such as a path from the ONU 2-1 to the layer 2 switch 3-m, and a path from the ONU 2-2 to the layer 2 switch 3-1.

Upon receiving a communication resource request from the orchestrator 5, the controller 4 determines whether or not a requested slice can be set, and if the slice can be set, sets the slice and allocates communication resources to the set slice. Specifically, upon receiving a communication resource request, the resource controlling unit 42 calculates the amount of communication resources that can be used among devices to which the slice is set on the basis of the resource information held by the resource managing unit 41. If the amount of communication resources that can be used is equal to or larger than the requested amount of communication resources, the resource controlling unit 42 then sets the slice and allocates communication resources to the slice.

Figure 4:
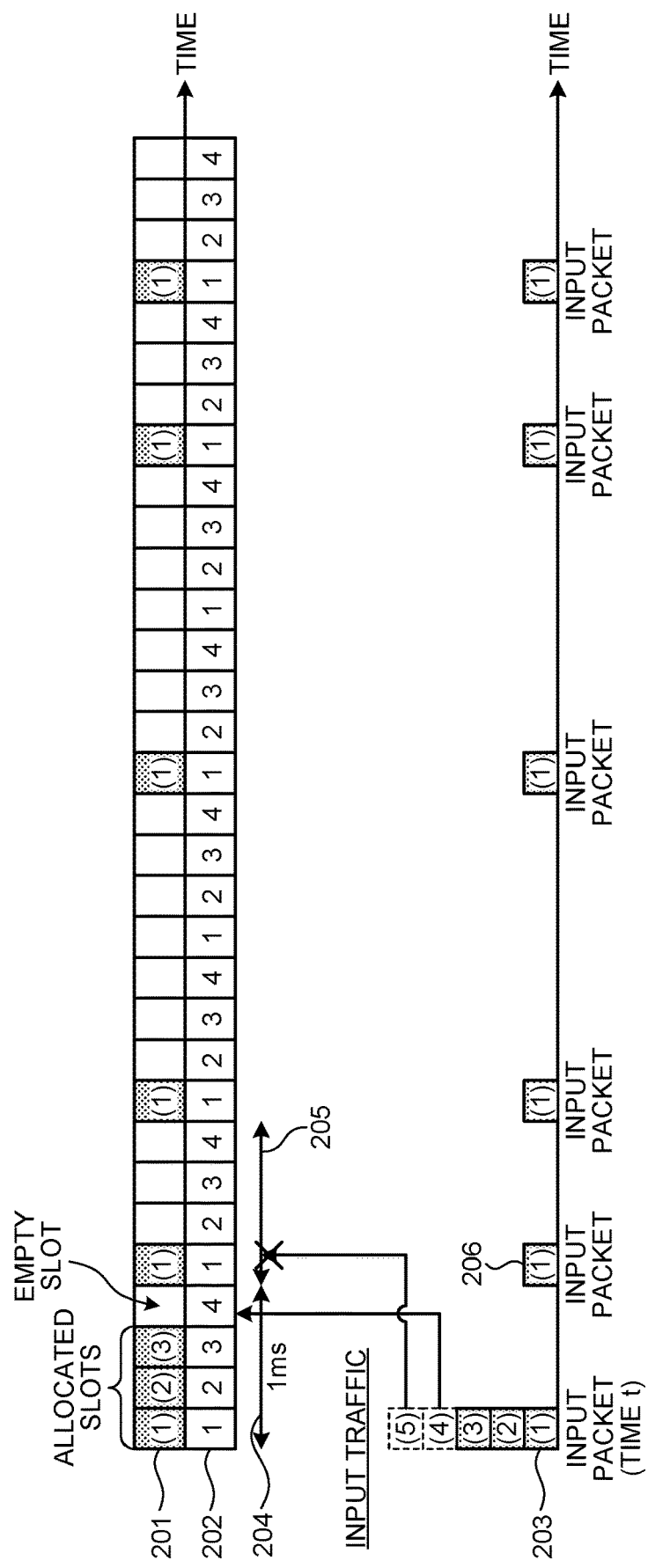
FIG. 4 is a diagram for explaining an example of operation for transmitting user data.

Next, an example of operation for transmitting user data by an ONU 2 will be explained with reference to FIG. 4. FIG. 4 is a diagram for explaining an example of the operation for transmitting user data. In FIG. 4, the horizontal axis represents time.

FIG. 4 illustrates that a packet train 203 of packets (1) to (3) is input to the ONU 2 at time t. FIG. 4 also illustrates that, after the packet train 203 is input, a packet (1) 206 and subsequent packets (1) are input intermittently to the ONU 2. The plurality of packets (1) illustrated in FIG. 4 are packets of the same type, and transmitted in the same slice. The packets (2) and (3) are packets of different types from the packets (1). The packets (1), (2), and (3) are transmitted in different slices from each other. The request delay of the packets (1) to (3) is assumed to be 1 ms.

In FIG. 4, the reference numeral 202 represents time slots during which the GRANT generating unit 13 of the OLT 1 grants transmission permission to the ONU 2. The numbers 1 to 4 indicate the numbers of the time slots. In the example illustrated in FIG. 4, the length of each time slot is 250 μs, and transmission permission is granted to the ONU 2 with a cycle of 1 ms. In the case where transmission permission is granted to the ONU 2 with a cycle of 1 ms, if a time slot included in one cycle is empty, the transmission delay of packets input to the ONU 2 is equal to or smaller than 1 ms and can thus meet the request delay. In the description below, the cycle with which the OLT 1 grants transmission permission to the ONUS 2 will be referred to as a band update cycle. The band update cycle is set for each slice on the basis of the request delay concerning each slice. For example, the band update cycle of a slice having a request delay of 1 ms is set to 1 ms, and the band update cycle of a slice having a request delay of 2 ms is set to 2 ms. Note that, while the length of time slots is fixed for simplicity of explanation in FIG. 4, the lengths of time slots may vary dynamically depending on the band update cycle. In addition, the number of time slots included in one band update cycle may be changed.

In FIG. 4, the reference numeral 201 represents a transmission timing at which user data (packet) are transmitted from the ONU 2 to the OLT 1. In a band update cycle 204, packets (1), (2), and (3) are transmitted to the OLT 1 in three time slots (time slots with the numbers 1 to 3) from the beginning. In a next band update cycle 205, a packet (1) 206 is transmitted to the OLT 1 in a time slot at the beginning. In subsequent six band update cycles a packet (1) is transmitted a total of four times. The other packets are not transmitted. In this case, eight band update cycles, that is, in a period of 8 ms illustrated in FIG. 4, an average band usage rate between the ONU 2 and the OLT 1 is 25%.

Assume here that packets (4) and (5) each with a request delay of 1 ms are further input at a timing of time t. In this case, one packet, the packet (4) for example, can be transmitted to the OLT 1 in the empty slot (the fourth time slot from the beginning) in the band update cycle 204. The remaining packet (5), however, cannot be transmitted in the band update cycle 204, and is to be transmitted in the band update cycle 205, which is the next of the band update cycle 204. Thus, the request delay of 1 ms cannot be met for the packet (5), and communication that meets the request cannot be achieved.

In the case where user data are transmitted as illustrated in FIG. 4, a known network control device such as the network monitoring device described in Patent Literature 1 allocates a band of 25% to communication with a request delay of 1 ms, and determines that a band of 75% is available as remaining communication resources. Thus, the value of available band is determined from an average value of the band usage rate. In the case of the example illustrated in FIG. 4, however, although the average value of the band usage rate is 25%, only one slot is empty in the band update cycle 204, the amount of remaining communication resources that can meet the request delay of 1 ms is 25%.

Thus, in the case of traffic in which peaks appear intermittently, the known network control device does not sufficiently comprehend the amount of use of the communication resources, and upon receiving a new communication resource request, determines that a slice can be generated even when it is in fact difficult to meet the request, and generates a slice.

Figure 5:
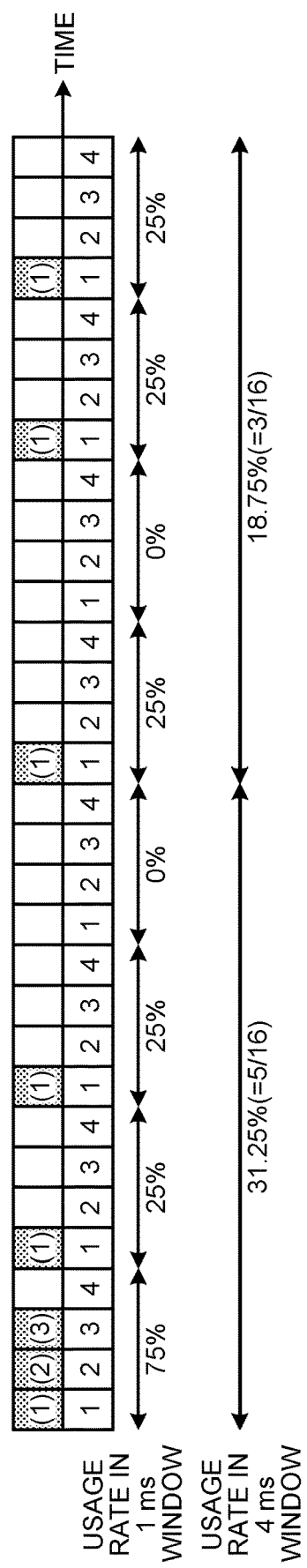
FIG. 5 is a diagram for explaining the operation of a resource information generating unit of the OLT according to the first embodiment.

In contrast, in the communication system 200 according to the present embodiment, the resource information generating unit 16 of the OLT 1 obtains a usage rate of communication resources in a plurality of windows of different sizes, generates resource information indicating the usage rate of communication resources in each window, and transmits the resource information to the controller 4 as illustrated in FIG. 5. The controller 4 then determines whether or not a slice that meets a request can be generated on the basis of the usage rate of communication resources in each window. In this manner, even in a case where peaks of the amount of use of communication resources appear intermittently as in the example illustrated in FIG. 4, whether or not a slice that meets a request can be generated can be determined with high accuracy. FIG. 5 is a diagram for explaining the operation of the resource information generating unit 16 of the OLT 1 according to the first embodiment. The resource information generating unit 16 obtains, from the GRANT generating unit 13, information on slots to which user data transmitted by the ONU 2 are allocated, and obtains the band usage rate in each of the windows of different sizes as illustrated in FIG. 5. The size, that is, the duration of each window is equal to the request delay concerning each set slice. In the example illustrated in FIG. 5, the resource information generating unit 16 obtains the band usage rate in each window with a size of 1 ms, and the band usage rate in each window with a size of 4 ms. Note that, in a case where slices other than those with request delays of 1 ms and 4 ms, such as slices with a request delay of 8 ms, are present, the resource information generating unit 16 also obtains the band usage rate in each window with a size of 8 ms.

The information collected from the GRANT generating unit 13 when the resource information generating unit 16 obtains the band usage rate in each window is information on the band to be allocated to the ONU 2, such as timing for granting transmission permission to the ONU 2 and the length of time for which transmission is to be permitted. Generally, in a PON system, transmission permission is periodically granted to an ONU, that is, at every band update cycle by a band allocation algorithm called dynamic bandwidth allocation (DBA), and the windows described above are synchronous with the band update cycles. Note that a band update cycle is individually set for each slice on the basis of the request delay concerning each slice. The resource information generating unit 16 may collect the information from the GRANT generating unit 13 for each ONU 2, or may collect the information for each logical link identifier (LLID). In addition, while an E-PON system defined by Institute of Electrical and Electronics Engineers (IEEE) 802.3 is assumed in the description of the present embodiment, a PON system defined by International Telecommunication Union Telecommunication standardization sector (ITU-T) may alternatively be used.

Figure 6:
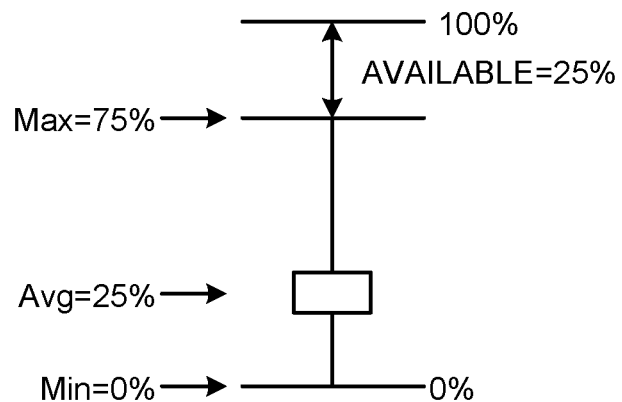
FIG. 6 is a diagram for explaining an operation of generating resource information by the resource information generating unit of the OLT according to the first embodiment.
Figure 7:
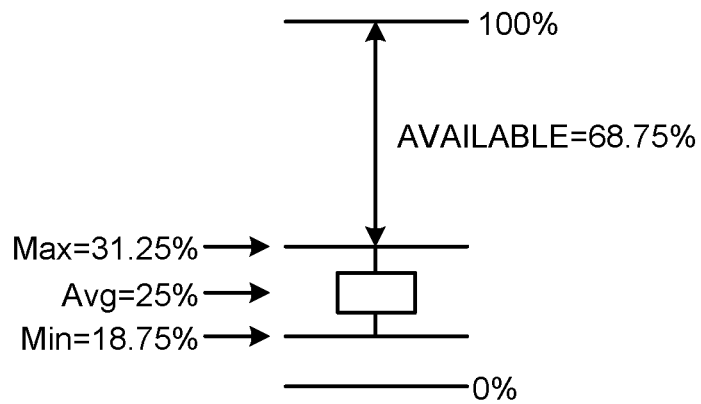
FIG. 7 is a diagram for explaining an operation of generating resource information by the resource information generating unit of the OLT according to the first embodiment.
Figures 8, 9:
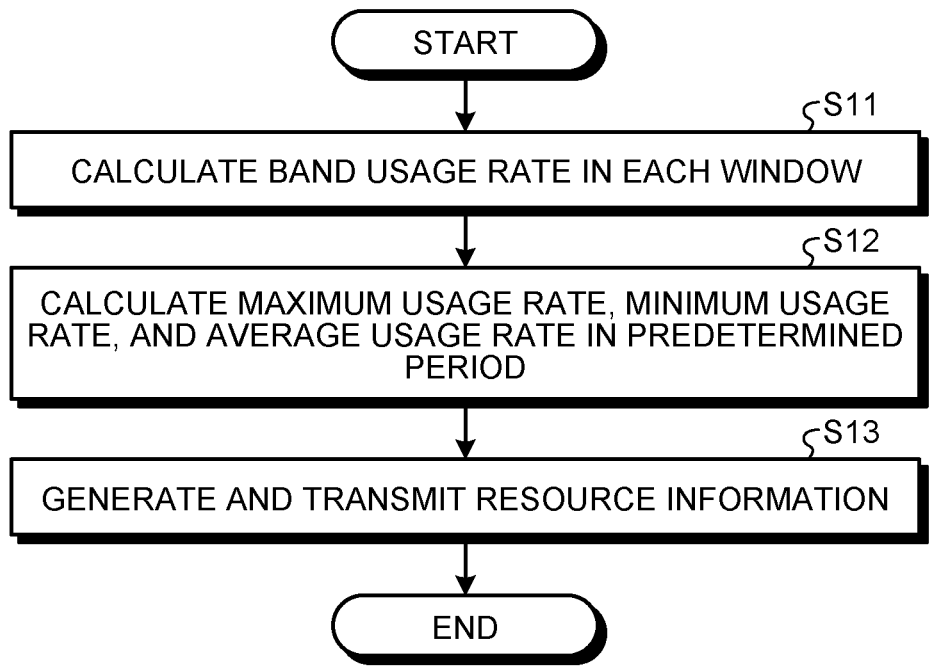
FIG. 8 is a table illustrating an example of resource information generated by the resource information generating unit of the OLT according to the first embodiment.
FIG. 9 is a flowchart illustrating an example of the operation of the resource information generating unit of the OLT according to the first embodiment.

The resource information generating unit 16 obtains a maximum band usage rate (Max), a minimum band usage rate (Min), and an average band usage rate (Avg) for each of the windows having the corresponding request delay as in FIGS. 6 and 7 on the basis of the band usage rate in each window. The resource information generating unit 16 then generates information on the band usage rate depending on the request delay of each path as illustrated in FIG. 8 on the basis of the obtained information, and transmits the generated information as resource information to the controller 4. FIGS. 6 and 7 are diagrams for explaining the operation of generating resource information by the resource information generating unit 16 of the OLT 1 according to the first embodiment. FIG. 8 is a table illustrating an example of the resource information generated by the resource information generating unit 16 of the OLT 1 according to the first embodiment. The resource information may include at least the maximum usage rate, and may include no minimum usage rate and no average usage rate.

In the case of the example illustrated in FIG. 5, the band usage rate in communication with a request delay of 1 ms is 75%, and the band usage rate in communication with a request delay of 4 ms is 31.25%. Thus, in the case of the example illustrated in FIGS. 5 and 6, because the maximum usage rate in the window with a request delay of 1 ms is 75%, the resource information generating unit 16 sets the band usage rate with the request delay of 1 ms in the resource information to 75% as illustrated in FIG. 8. In addition, in the case of the example illustrated in FIGS. 5 and 7, because the maximum usage rate in the window with a request delay of 4 ms is 31.25%, the resource information generating unit 16 sets the band usage rate with the request delay of 4 ms in the resource information to 31.25% as illustrated in FIG. 8. As a result of performing the determination process using the maximum usage rate as the band usage rate, and then performing slice generation and band allocation, communication that continuously meets requests can be achieved.

Note that, while the resource information generating unit 16 obtains the maximum usage rate, the minimum usage rate, and the average usage rate on the basis of a previous period of 8 ms in the examples illustrated in FIGS. 5 to 7, the length of the period in which the usage rates are obtained may be 8 ms or longer. In this case, the length of the period is preferably an integer multiple of the maximum value 4 ms of the request delays. In addition, the length of the period on the basis of which the maximum usage rate, the minimum usage rate, and the average usage rate are obtained may vary depending on each of the values of request delay. For example, the period on the basis of which the maximum usage rate, the minimum usage rate and the average usage rate in a window corresponding to a request delay of 1 ms are obtained may be a previous period of 5 ms, and the period on the basis of which the maximum usage rate, the minimum usage rate and the average usage rate in a window corresponding to a request delay of 4 ms are obtained may be a previous period of 8 ms.

In the case where the resource information generating unit 16 of the OLT 1 generates the resource information as illustrated in FIG. 8 and transmits the resource information to the controller 4, the resource controlling unit 42 of the controller 4 determines, on the basis of the resource information, that the available amount of communication resources that can meet the request delay of 1 ms is 25% and that the available amount of communication resources that can meet the request delay of 4 ms is 68.75%. Thus, in a case where communication resources of more than 25% are requested when a new communication resource request with a request delay of 1 ms is received from the orchestrator 5, the resource controlling unit 42 can determine that communication resources cannot be allocated, that is, a slice cannot be generated. As described above, the controller 4 according to the present embodiment can determine with high accuracy whether or not a slice that meets a request can be generated to generate a slice and allocate communication resources even in the presence of traffic in which peaks appear intermittently as in the example illustrated in FIG. 4.

The resource information generating unit 16 of the OLT 1 repeats generation of resource information with a predetermined cycle such as a cycle of 1 ms, and transmits the resource information to the controller 4.

Note that the resource information generating unit 16 of the OLT 1 may generate the resource information illustrated in FIG. 8 by using information output from the REPORT analyzing unit 14 or information output from the traffic monitoring unit 15 instead of the information output from the GRANT generating unit 13. Methods by which the resource information generating unit 16 generates resource information by using information output from the REPORT analyzing unit 14 or information output from the traffic monitoring unit 15 will be explained in a second and subsequent embodiments.

FIG. 9 is a flowchart illustrating an example of the operation of the resource information generating unit 16 of the OLT 1 according to the first embodiment. The resource information generating unit 16 performs the operation according to the flowchart illustrated in FIG. 9 at a predetermined cycle to generate resource information.

The resource information generating unit 16 first calculates a band usage rate in each window (step S11), and calculates a maximum usage rate, a minimum usage rate and an average usage rate in a predetermined period (step S12). Subsequently, the resource information generating unit 16 generates resource information on the basis of the calculated maximum usage rate, minimum usage rate and average usage rate, and transmits the resource information to the controller 4 (step S13).

Figure 10:
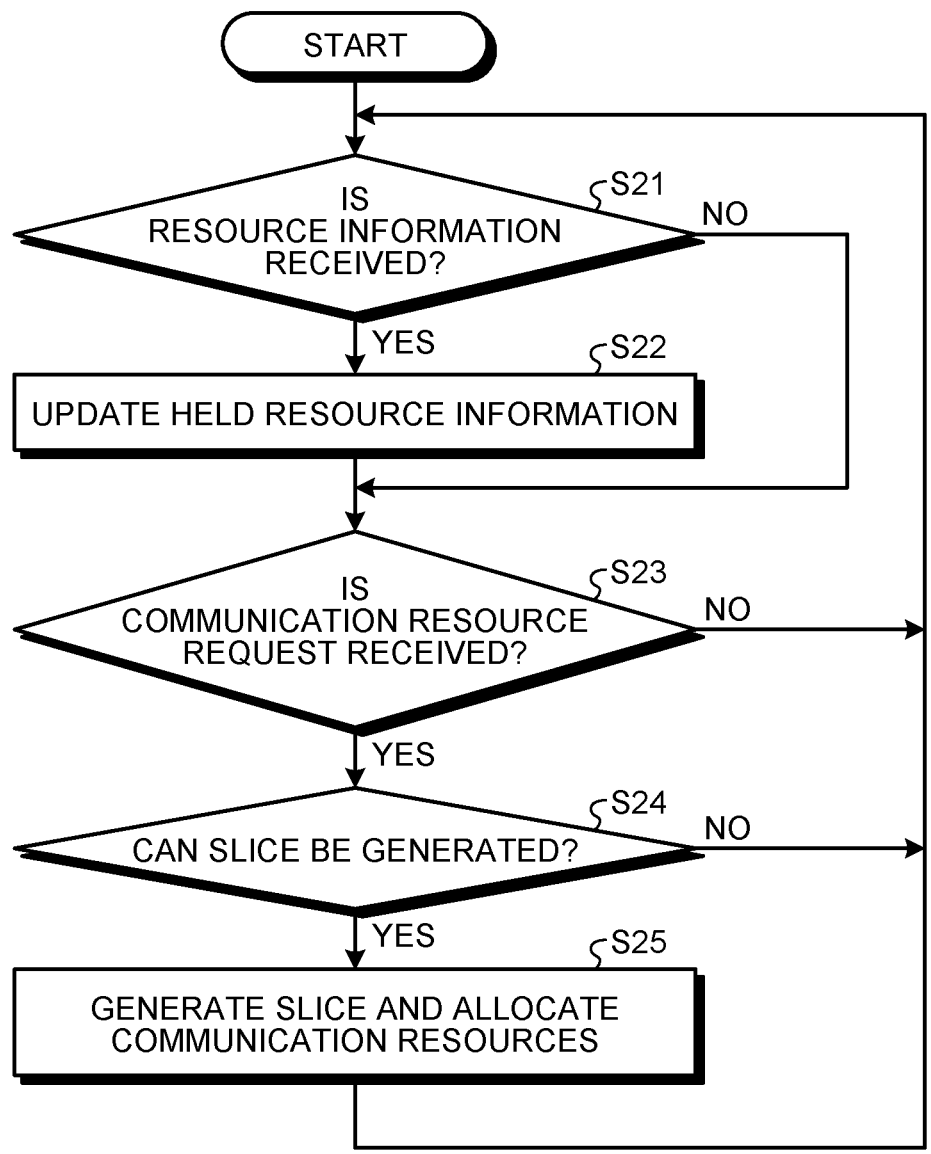
FIG. 10 is a flowchart illustrating an example of the operation of the controller according to the first embodiment.

In addition, FIG. 10 is a flowchart illustrating an example of the operation of the controller 4 according to the first embodiment. The controller 4 operates in accordance with the flowchart illustrated in FIG. 10 to generate a slice and allocate communication resources to the slice.

In the controller 4, the resource managing unit 41 checks whether or not resource information generated by the resource information generating unit 16 of the OLT 1 is received (step S21). If the resource information is received (step S21: Yes), the resource managing unit 41 updates resource information held therein, that is, discards resource information that was previously received from the OLT 1 that has transmitted the currently received resource information and was stored therein, and stores the currently received resource information (step S22). If the resource information is not received (step S21: No), the resource managing unit 41 does not perform the process in step S22.

If the resource managing unit 41 has performed the process in step S22 or the determination in step S21 is "No", the resource controlling unit 42 checks whether or not a communication resource request is received from the orchestrator 5 (step S23). If a communication resource request is received (step S23: Yes), the resource controlling unit 42 checks, on the basis of the resource information held by the resource managing unit 41, whether or not a slice that is requested by the communication resource request can be generated (step S24). If a slice can be generated (step S24: Yes), the resource controlling unit 42 generates the requested slice, and allocates communication resources to the generated slice (step S25). After the process in step S25 is completed, the operation returns to step S21.

If no communication resource request is received (step S23: No) and if a communication resource request is received but a slice cannot be generated (step S24: No), the operation of the controller 4 returns to step S21. Note that, if it is determined in step S24 that a slice cannot be generated, the controller 4 may inform the orchestrator 5 that a slice that meets the request cannot be generated, for example.

As described above, in the communication system 200 according to the present embodiment, the OLT 1 of the PON system 100 calculates a usage rate of communication resources in each of a plurality of windows of different sizes included in a predetermined period, and informs the controller 4 of resource information including a maximum value of the calculated usage rates. Upon receiving a communication resource request requesting generation of a slice, the controller 4 determines whether or not the requested slice can be generated on the basis of the maximum value of the usage rates of the communication resources in each of the windows of different sizes. According to the present embodiment, the controller 4 can accurately obtain communication resources that can be used by individual network devices. Thus, the controller 4 can allocate minimum communication resources to each slice, and allocating communication resources that can meet required performance to each slice while preventing network use efficiency from being unnecessarily lowered.

In addition, the controller 4 refers to information on a band that the OLT 1 allocates to an ONU 2, such as timing for granting transmission permission to the ONU 2 and the length of time for which transmission is to be permitted, and obtains the amount of signals to be transmitted from the ONU 2 to the OLT 1, which enables estimation of a band to be used for PON control, and a band for overhead necessary for the OLT 1 to receive signals from the ONU 2. As a result, the controller 4 also produces an effect of being capable of calculating a net available band excluding the PON control overhead.

In addition, while the OLT 1 calculates a maximum usage rate in each window and informs the controller 4 of the maximum usage rate as resource information in the present embodiment, the OLT 1 may generate distribution of probability of occurrence of a certain usage rate, and provide information of the probability distribution as resource information. In this case, the controller 4 performs allocation of communication resources in view of a request meeting probability such as by excluding a maximum usage rate that has occurred with a very low probability, which can improve the use efficiency of the whole network.

In addition, while the OLT 1 calculates a maximum usage rate in each window and informs the controller 4 of the maximum usage rate as resource information in the present embodiment, the OLT 1 may also inform the controller 4 of an average usage rate, and the controller 4 may use the average usage rate to modify allocation of communication resources. This can reduce the burden of cost on users of a pay-per-use network service in which charges change depending on network use amounts, and improve the use efficiency of the whole network.

Note that, while the OLT 1 includes the resource information generating unit 16 and transmits resource information generated by the resource information generating unit 16 to the controller 4 in the present embodiment, resource information may be generated in the controller 4. Specifically, the OLT 1 may transmit information used for generation of resource information by the resource information generating unit 16 to the controller 4, and the controller 4 may perform processes similar to those of the resource information generating unit 16 of the OLT 1 to generate resource information on the basis of the information received from the OLT 1.

Second Embodiment

Next, a second embodiment will be described. A communication system configuration according to the second embodiment is similar to that in the first embodiment (see FIG. 1). Thus, the description of the present embodiment will also refer to FIG. 1. In addition, the functional block configurations of the OLT 1 and the controller 4 included in the communication system 200 are similar to those in the first embodiment (see FIG. 2). Thus, the description of the present embodiment will also refer to FIG. 2. Note that, in the present embodiment, description of parts in common with those in the first embodiment will not be repeated.

As described above, the resource information generating unit 16 of the OLT 1 according to the first embodiment calculates a maximum band usage rate in each window by using information output from the GRANT generating unit 13, and transmits the maximum band usage rate as resource information to the controller 4. On the other hand, the resource information generating unit 16 of the OLT 1 according to the second embodiment calculates a band usage rate in each window described in the first embodiment by using information output from the REPORT analyzing unit 14, and further obtains a maximum band usage rate.

The REPORT analyzing unit 14 of the OLT 1 analyzes control data (REPORT) transmitted from each of the ONUs 2. The control data herein are REPORT frames. A REPORT frame includes information indicating the amount of transmission standby data at an ONU 2, and information on data to be transmitted from the ONU 2, such as the priority, the data type, and the like of the transmission standby data. The REPORT analyzing unit 14 extracts, from the REPORT frame, the information relating to the data to be transmitted from the ONU 2, and outputs the information to the resource information generating unit 16.

The resource information generating unit 16 according to the second embodiment sets windows, and calculates the data amount of transmission standby data (hereinafter referred to as a transmission standby data amount) in each window on the basis of the information input from the REPORT analyzing unit 14 in a manner similar to the first embodiment.

In the present embodiment, assume that each ONU 2 includes buffers depending on the priority of user data, and informs the OLT 1 of the transmission standby data amounts in the individual buffers with different priorities by using a REPORT frame. Hereinafter, a transmission standby data amount of which an ONU 2 informs the OLT 1 by using a REPORT frame will be referred to as a REPORT amount. The resource information generating unit 16 calculates a data rate expressed in bits per second of each of high-priority data and low-priority data in a window on the basis of the REPORT amount of each of the buffers of the ONU 2, and obtains a maximum band usage rate from the data rates.

FIG. 11 is a table illustrating an example of the resource information generated by the resource information generating unit 16 of the OLT 1 according to the second embodiment. In the case of the resource information as illustrated in FIG. 11, in communication with a request delay of 1 ms, the band usage rate in transmission of high-priority data is 25%, and the band usage rate in transmission of low-priority data is 50%, and a total of a band of 75% may be used. The resource information illustrated in FIG. 11 indicates the band usage rate depending on the request delay and depending on the priority of user data.

The REPORT amount indicates the amount of data input to an ONU 2 from base stations, sensors, and the like connected with the ONU 2. The controller 4 can therefore estimate the amount of generated user data depending on the priority with each request delay by using resource information as illustrated in FIG. 11. For example, assume a case where the controller 4 has received a new communication resource request that requests use of a band of 30% for transmission of high-priority user data with a request delay of 1 ms. In this case, the resource information in FIG. 11 indicates that a band of 75% has already been allocated for transmission of data with a request delay of 1 ms, and a band of 30% cannot be allocated. Thus, the resource controlling unit 42 of the controller 4 instructs the OLT 1 to reduce the peak amount of band to be allocated to low-priority user data by 5%, so as to lower a total band usage rate to 70%. As a result, a band of 30% can now be allocated, and the resource controlling unit 42 thus generates a slice for the new communication resource request and allocates a band of 30% thereto.

Note that, while the resource information generating unit 16 in the OLT 1 according to the present embodiment generates resource information on the basis of the information obtained from the REPORT analyzing unit 14, a configuration in which similar information is obtained from the band controlling unit 17 may be used, and resource information may be generated on the basis of the information obtained from the band controlling unit 17.

As described above, the resource information generating unit 16 of the OLT 1 according to the present embodiment generates resource information on the basis of information relating to user data to be transmitted from an ONU 2 included in a REPORT frame received from the ONU 2. The resource information indicates the band usage rate depending on the request delay and depending on the priority of user data. As a result, the controller 4 can obtain band usage rates depending on the priority in addition to the request delay, and in response to a communication resource request, adjust the band usage rates in view of the priority of user data and then allocate communication resources preferentially to transmission of high-priority user data.

While the OLT 1 calculates a maximum usage rate in each window depending on the priority of user data and informs the controller 4 of the maximum usage rate as resource information in the present embodiment, the OLT 1 may generate distribution of probability of occurrence of a certain usage rate, and provide information of the probability distribution as resource information. In this case, the controller 4 performs allocation of communication resources in view of a request meeting probability such as by excluding a maximum usage rate that has occurred with a very low probability, which can improve the use efficiency of the whole network.

Third Embodiment

Next, a third embodiment will be described. A communication system configuration according to the third embodiment is similar to that in the first embodiment (see FIG. 1). Thus, the description of the present embodiment will also refer to FIG. 1. In addition, the functional block configurations of the OLT 1 and the controller 4 included in the communication system 200 are similar to those in the first embodiment (see FIG. 2). Thus, the description of the present embodiment will also refer to FIG. 2. Note that, in the present embodiment, description of parts in common with those in the first and second embodiments will not be repeated.

As described above, the resource information generating unit 16 of the OLT 1 according to the second embodiment calculates a maximum band usage rate in each window by using information output from the REPORT analyzing unit 14, and transmits the maximum band usage rate as resource information to the controller 4. On the other hand, the resource information generating unit 16 of the OLT 1 according to the third embodiment calculates a band usage rate in each window described in the first embodiment by using information output from the traffic monitoring unit 15, and further obtains a maximum band usage rate.

The traffic monitoring unit 15 collects statistics of the number of frames and the length in bytes of user data transmitted from each of the ONUs 2, and informs the resource information generating unit 16 of the statistics.

The traffic monitoring unit 15 can collect control information included in headers of frames for transmitting user data, or more specifically, destination information, priority information such as a type of service (ToS) and a class of service (CoS), and information on the data amount of each slice.

The resource information generating unit 16 according to the present embodiment generates traffic information as illustrated in FIG. 12 or 13 on the basis of various information collected by the traffic monitoring unit 15. FIG. 12 is a table illustrating a first example of the resource information generated by the resource information generating unit 16 of the OLT 1 according to the third embodiment. FIG. 13 is a table illustrating a second example of the resource information generated by the resource information generating unit 16 of the OLT 1 according to the third embodiment. The resource information generating unit 16 calculates a band usage rate at each priority for each request delay as illustrated in FIG. 12. Alternatively, the resource information generating unit 16 calculates a band usage rate of each slice for each request delay as illustrated in FIG. 13.

In a case where the resource information generating unit 16 generates the traffic information having the configuration illustrated in FIG. 12, the resource controlling unit 42 of the controller 4 performs band allocation in view of the priority of user data to be transmitted in a slice to be generated in response to a new communication resource request, and in view of the priority of user data to be transmitted in previously generated slices. For example, in a case where a slice in which second user data, which have a lower priority than that of first user data to be transmitted in a slice to be newly generated, are transmitted is present, the resource controlling unit 42 instructs the OLT 1 to reduce the amount of communication resources allocated to the slice in which the second data with the lower priority are transmitted, so as to reserve communication resources to be allocated to the slice to be newly generated.

In addition, in a case where the resource information generating unit 16 generates the traffic information having the configuration illustrated in FIG. 13, the resource controlling unit 42 of the controller 4 determines the path of a slice to be newly generated in response to a new communication resource request in view of the band usage rate in each slice. For example, in a case where a plurality of other network devices are present between two network devices for which a slice is to be set and a plurality of candidates for the path of the slice to be set are present, the resource controlling unit 42 sets a slice so that user data are transferred on a path passing a network device with a low usage rate, on the basis of the traffic information obtained from each of the other network devices present between the two network devices for which the slice is to be set.

As described above, the resource information generating unit 16 of the OLT 1 according to the present embodiment generates resource information on the basis of the information collected by the traffic monitoring unit 15, or more specifically, the statistic information such as the number of frames and the length in bytes of user data transmitted from each of the ONUs 2 and the control information included in headers of frames. The resource information indicates the band usage rate depending on the request delay and depending on the priority of user data. As a result, in a manner similar to the second embodiment, the controller 4 can adjust the band usage rates in view of the priority of user data, and then allocate communication resources preferentially to transmission of high-priority user data. Alternatively, the resource information indicates a band usage rate depending on the request delay and in each of previously set slices. As a result, the controller 4 can determine a path on which a slice is to be set in view of the band usage rate, depending on the slice, of each of the other network devices present between the two network devices for which a slice is to be set.

In addition, the OLT 1 according to the present embodiment can be achieved by using simpler hardware or software than those in the first and second embodiment.

Note that, while the operation of combination of the OLT 1 of the PON system 100 and the controller 4 has been described in the present embodiment, similar operation can also be achieved in a case of combination with a relay such as the layer 2 switches 3 or a router, instead of the OLT 1. In this case, the functions of the relay such as traffic shaping and rate limiting are used for band control and path setting for user data.

Figure 14:
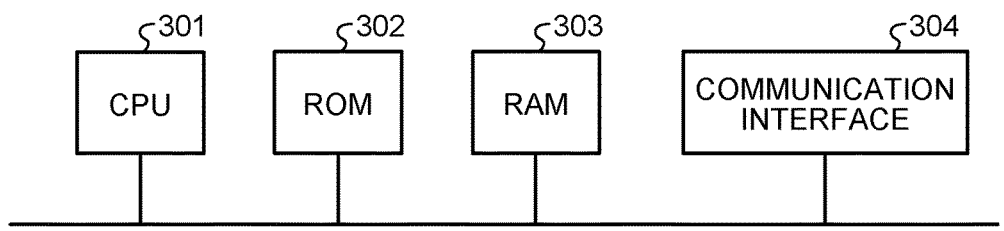
FIG. 14 is a diagram illustrating an example of hardware for implementing a controller according to the first to third embodiments.

A hardware configuration of the controller 4 explained in the embodiments will now be described with reference to FIG. 14. FIG. 14 is a diagram illustrating an example of hardware for implementing the controller 4 according to the first to third embodiments.

The controller 4 is implemented by a central processing unit (CPU) 301, a read only memory (ROM) 302, a random access memory (RAM) 303, and a communication interface 304 illustrated in FIG. 14, for example. The CPU 301, the ROM 302, the RAM 303, and the communication interface 304 are connected with one another with a bus. The CPU 301 performs processing and control of the entire controller 4. The ROM 302 stores programs such as boot programs, communication programs, and data analysis programs. The RAM 303 is used as a work area of the CPU 301. The communication interface 304 is connected with the OLT 1, the layer 2 switches 3, and the orchestrator 5, to transmit and receive signals to and from the connected devices.

The resource managing unit 41 and the resource controlling unit 42 of the controller 4 are implemented by software, firmware, or a combination of software and firmware. The software and firmware are described in the form of programs and stored in the ROM 302. The CPU 301 implements the functions of the resource managing unit 41 and the resource controlling unit 42 by reading and executing the programs stored in the ROM 302.

Figure 15:
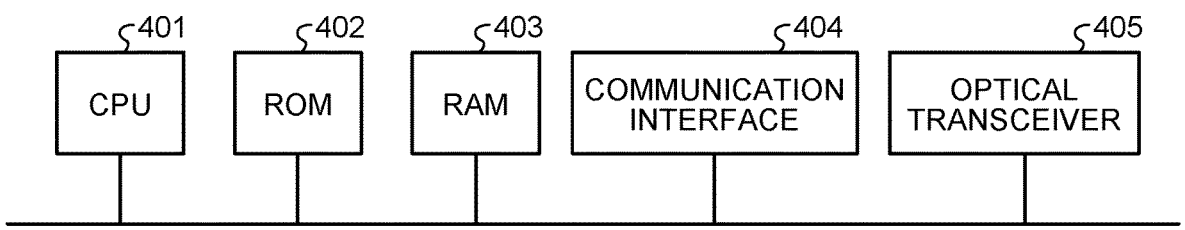
FIG. 15 is a diagram illustrating an example of hardware for implementing an OLT according to the first to third embodiments.

Next, a hardware configuration of the OLT 1 explained in the embodiments will be described with reference to FIG. 15. FIG. 15 is a diagram illustrating an example of hardware for implementing the OLT 1 according to the first to third embodiments.

The OLT 1 is implemented by a CPU 401, a ROM 402, a RAM 403, a communication interface 404, and an optical transceiver 405 illustrated in FIG. 15, for example. The CPU 401, the ROM 402, the RAM 403, the communication interface 404, and the optical transceiver 405 are connected with one another via a bus. The CPU 401 performs processing and control of the entire OLT 1. The ROM 402 stores programs such as boot programs, communication programs, and data analysis programs. The RAM 403 is used as a work area of the CPU 401. The communication interface 404 is connected with the layer 2 switches 3 and the controller 4, to transmit and receive signals to and from the connected devices.

The frame transmitting unit 11, the frame receiving unit 12, the GRANT generating unit 13, the REPORT analyzing unit 14, the traffic monitoring unit 15, the resource information generating unit 16, and the band controlling unit 17 of the OLT 1 are implemented by software, firmware, or combination of software and firmware. The software and firmware are described in the form of programs and stored in the ROM 402. The CPU 401 implements the functions of the frame transmitting unit 11, the frame receiving unit 12, the GRANT generating unit 13, the REPORT analyzing unit 14, the traffic monitoring unit 15, the resource information generating unit 16, and the band controlling unit 17 by reading and executing the programs stored in the ROM 402.

A network control device according to the present disclosure produces an advantageous effect of being capable of allocating communication resources that can meet the performance required of a service to a slice while preventing network use efficiency from being unnecessarily lowered.

The configurations presented in the above embodiments are examples, and can be combined with other known technologies or can be partly omitted or modified without departing from the scope.

What is claimed is:

1. A network control device for generating a slice by dividing a network and allocating communication resources to the slice, the slice being a virtual network, the network control device comprising:
   a processor; and
   a memory to store a program which, when executed by the processor, performs processes of:
   obtaining and holding resource information from a network device included in the network, the resource information including information on a maximum usage rate of communication resources allocated to a previously generated slice in at least one predetermined period; and
   determining, upon receiving a request for generating a new slice, whether or not the requested slice can be generated on the basis of the resource information held, wherein
   the resource information includes information on a maximum usage rate of communication resources, which are allocated to the previously generated slice, depending on a request delay concerning the slice in the predetermined period.

2. The network control device according to claim 1, wherein
   the network device is a master station device of a passive optical network system, and
   the resource information obtained is generated on the basis of a timing for granting transmission permission to a slave station device of the passive optical network system by the master station device and a length of time for which transmission is to be permitted.

3. The network control device according to claim 2, wherein
when the processor determines that the requested slice can be generated, the processor generates the slice, and allocates communication resources to the generated slice.

4. The network control device according to claim 1, wherein
the network device is a master station device of a passive optical network system, and
the resource information obtained is generated on the basis of a data amount of transmission standby data held by a slave station device of the passive optical network system.

5. The network control device according to claim 4, wherein
when the processor determines that the requested slice can be generated, the processor generates the slice, and allocates communication resources to the generated slice.

6. The network control device according to claim 1, wherein
the network device is a master station device of a passive optical network system, and
the resource information obtained is generated on the basis of control information included in a frame with which the master station device receives user data from a slave station device of the passive optical network system.

7. The network control device according to claim 6, wherein
when the processor determines that the requested slice can be generated, the processor generates the slice, and allocates communication resources to the generated slice.

8. The network control device according to claim 1, wherein
the network device is a relay included in the network, and
the resource information obtained is generated on the basis of control information included in a frame with which the relay has received user data.

9. The network control device according to claim 8, wherein
when the processor determines that the requested slice can be generated, the processor generates the slice, and allocates communication resources to the generated slice.

10. The network control device according to claim 1, wherein
when the processor determines that the requested slice can be generated, the processor generates the slice, and allocates communication resources to the generated slice.

11. A communication resource allocation method performed by a network control device that generates a slice by dividing a network and allocates communication resources to the slice, the slice being a virtual network, the communication resource allocation method comprising:
obtaining resource information from a network device included in the network, the resource information including information on a maximum usage rate of communication resources allocated to a previously generated slice in at least one predetermined period;
determining, upon receiving a request for generating a new slice, whether or not the requested slice can be generated on the basis of the resource information; and
generating a slice requested by the request for generating a new slice when the requested slice can be generated, and allocating communication resources to the generated slice, wherein
the resource information includes information on a maximum usage rate of communication resources, which are allocated to the previously generated slice, depending on a request delay concerning the slice in the predetermined period.

12. A communication system comprising:
a network control device to generate a slice by dividing a network and allocate communication resources to the slice, the slice being a virtual network; and
a network device included in the network, wherein
the network device includes:
a first processor; and
a first memory to store a first program which, when executed by the first processor, performs processes of:
generating resource information including information on a maximum usage rate of communication resources allocated to a previously generated slice in at least one predetermined period,
the network control device includes:
a second processor; and
a second memory to store a second program which, when executed by the second processor, performs processes of:
obtaining and holding the resource information generated; and
determining, upon receiving a request for generating a new slice, whether or not the requested slice can be generated on the basis of the resource information held, wherein
the first processor generates the resource information including a maximum usage rate of communication resources allocated to the previously generated slice depending on a request delay concerning the slice in the predetermined period.

13. The communication system according to claim 12, wherein
the network device is a master station device of a passive optical network system included in the network, and
the first processor generates the resource information on the basis of a timing for granting transmission permission to a slave station device of the passive optical network system and a length of time for which transmission is to be permitted.

14. The communication system according to claim 13, wherein
the first processor generates the resource information further including information indicating a probability distribution, in a predetermined period, of maximum usage rates of communication resources in the predetermined period.

15. The communication system according to claim 12, wherein
the network device is a master station device of a passive optical network system included in the network, and
the first processor generates the resource information on the basis of a data amount of transmission standby data held by a slave station device of the passive optical network system.

16. The communication system according to claim 15, wherein
the first processor generates the resource information further including information indicating a probability distribution, in a predetermined period, of maximum usage rates of communication resources in the predetermined period.

17. The communication system according to claim 12, wherein
    the network device is a master station device of a passive optical network system included in the network or a relay included in the network, and
    the first processor generates the resource information on the basis of control information included in a frame with which user data are received.

18. The communication system according to claim 17, wherein
    the first processor generates the resource information further including information indicating a probability distribution, in a predetermined period, of maximum usage rates of communication resources in the predetermined period.

19. The communication system according to claim 12, wherein
    the first processor generates the resource information further including information indicating a probability distribution, in a predetermined period, of maximum usage rates of communication resources in the predetermined period.

* * * * *